US009529776B2

(12) United States Patent
Yasuda

(10) Patent No.: US 9,529,776 B2
(45) Date of Patent: Dec. 27, 2016

(54) DATA REWRITING SUPPORT SYSTEM AND DATA REWRITING SUPPORT METHOD FOR VEHICLE CONTROL APPARATUS

(75) Inventor: Toshihiro Yasuda, Shinagawa-ku (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/001,319

(22) PCT Filed: Feb. 24, 2012

(86) PCT No.: PCT/IB2012/000334
§ 371 (c)(1),
(2), (4) Date: Aug. 23, 2013

(87) PCT Pub. No.: WO2012/114194
PCT Pub. Date: Aug. 30, 2012

(65) Prior Publication Data
US 2013/0339721 A1    Dec. 19, 2013

(30) Foreign Application Priority Data
Feb. 25, 2011   (JP) .................................. 2011-040353

(51) Int. Cl.
*G07C 5/00* (2006.01)
*H04L 12/417* (2006.01)
(Continued)

(52) U.S. Cl.
CPC ............ *G06F 15/177* (2013.01); *G07C 5/008* (2013.01); *H04L 12/417* (2013.01); *H04L 67/12* (2013.01);
(Continued)

(58) Field of Classification Search
CPC ............ G11C 16/102; G06F 8/65; G06F 8/60; H04L 67/12; B60W 2050/0005; H04M 1/72525
See application file for complete search history.

(56) References Cited

U.S. PATENT DOCUMENTS 9,158,531 B2 * 10/2015 Lin ..................... H04L 67/1063
9,176,724 B2 * 11/2015 Kwak ....................... G06F 8/65
717/168
(Continued)

FOREIGN PATENT DOCUMENTS

| JP | 2003-233504 | 8/2003 |
| JP | 2004-038616 | 2/2004 |

(Continued)

OTHER PUBLICATIONS

Jens Mittag et al., Analysis and Design of Effective and Low-Overhead Transmission Power Control for VANETs, ACM, 2008, retrieved online on Aug. 23, 2016, pp. 39-48. Retrieved from the Internet: <URL: http://delivery.acm.org/10.1145/1420000/1410051/p39-mittag.pdf?>.*
(Continued)

*Primary Examiner* — Thuy Dao
*Assistant Examiner* — Hanh T Bui
(74) *Attorney, Agent, or Firm* — Oblon, McClelland, Maier & Neustadt, L.L.P.

(57) ABSTRACT

A data rewriting support system for a vehicle control apparatus including: a downloading device that downloads data relating to a control program or control data used to control the vehicle control apparatus from outside; and a rewriting data transmission control device that obtains rewriting data on the basis of the data downloaded by the downloading device and transmits the rewriting data to the vehicle control apparatus connected communicably to a vehicle network, wherein the rewriting data transmission control device monitors a transmission condition of data transmitted to the vehicle network and transmits the rewriting data to the
(Continued)

vehicle network in accordance with the monitored data transmission condition.

9 Claims, 8 Drawing Sheets

(51) Int. Cl.
| | | |
|---|---|---|
| *G06F 9/44* | (2006.01) | |
| *G06F 15/177* | (2006.01) | |
| *H04L 29/08* | (2006.01) | |
| *G06F 9/445* | (2006.01) | |
| *G06F 7/60* | (2006.01) | |
| *H04M 1/725* | (2006.01) | |

(52) U.S. Cl.
CPC . *G06F 7/60* (2013.01); *G06F 8/65* (2013.01); *H04M 1/72525* (2013.01)

(56) References Cited

U.S. PATENT DOCUMENTS

| | | | |
|---|---|---|---|
| 2003/0154188 A1 | 8/2003 | Toshimitsu et al. | |
| 2005/0065716 A1* | 3/2005 | Timko | G01S 19/16 701/29.3 |
| 2005/0251579 A1 | 11/2005 | Ngo et al. | |
| 2006/0047381 A1 | 3/2006 | Nguyen | |
| 2008/0008209 A1* | 1/2008 | Morimoto | H04L 12/40013 370/458 |
| 2008/0148268 A1 | 6/2008 | Hirouchi | |
| 2009/0187289 A1* | 7/2009 | Teramura | G06F 8/65 701/1 |
| 2010/0011348 A1* | 1/2010 | Honma | H04N 21/26291 717/168 |
| 2011/0126182 A1* | 5/2011 | Kwak | G06F 8/65 717/168 |
| 2011/0307882 A1 | 12/2011 | Shiba | |
| 2011/0314462 A1* | 12/2011 | Clark | G06F 8/65 717/169 |
| 2013/0227650 A1* | 8/2013 | Miyake | H04L 63/08 726/3 |
| 2013/0339721 A1* | 12/2013 | Yasuda | G07C 5/008 713/100 |
| 2014/0245284 A1* | 8/2014 | Alrabady | G06F 8/65 717/173 |
| 2015/0113521 A1* | 4/2015 | Suzuki | G06F 8/65 717/173 |

FOREIGN PATENT DOCUMENTS

| | | |
|---|---|---|
| JP | 2004-192278 | 7/2004 |
| JP | 2005-349878 | 12/2005 |
| JP | 2010-028355 | 2/2008 |
| JP | 2008-152482 | 7/2008 |
| JP | 2009-110528 | 5/2009 |
| WO | 2010-113348 | 10/2010 |

OTHER PUBLICATIONS

Rognqing Zhang et al., A Unified TDMA-Based Scheduling Protocol for Vehicle-to-Infrastructure Communications, IEEE, 2013, retrieved online on Aug. 23, 2016, pp. 1-6. Retrieved from the Internet: <URL: http://ieeexplore.ieee.org/stamp/stamp.jsp?arnumber=6677153>.*

International Search Report Issued Jun. 6, 2012 on PCT/IB12/000334 Filed Feb. 24, 2012.

* cited by examiner

| ID | TRANSMISSION DATA |
|---|---|
| 0×0 | VEHICLE DATA A |
| 0×1 | VEHICLE DATA B |
| 0×2 | . |
| . | . |
| 0×7FF | REWRITING DATA |

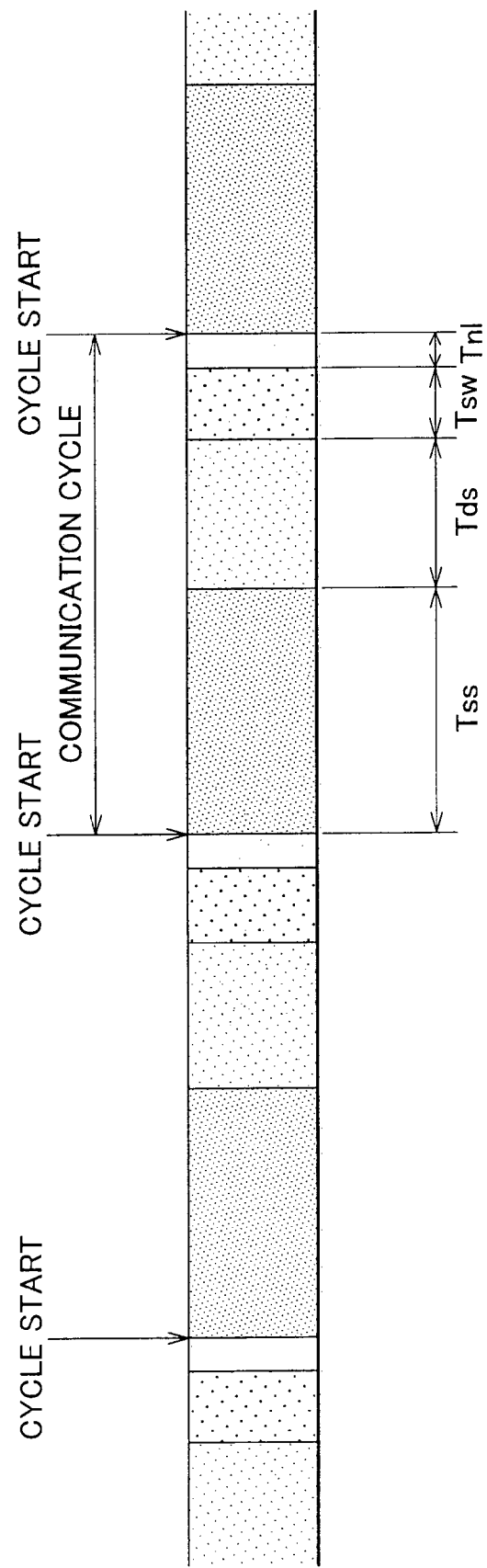

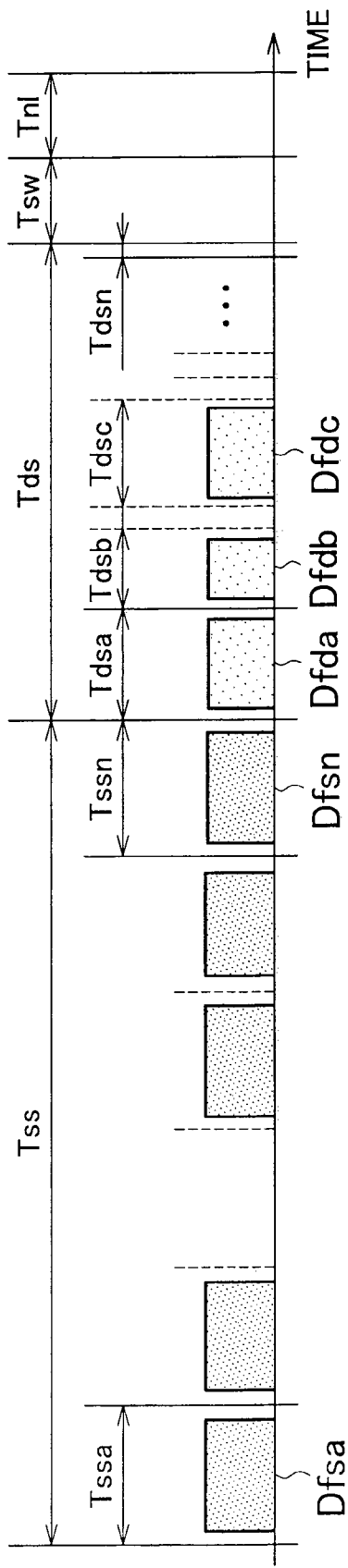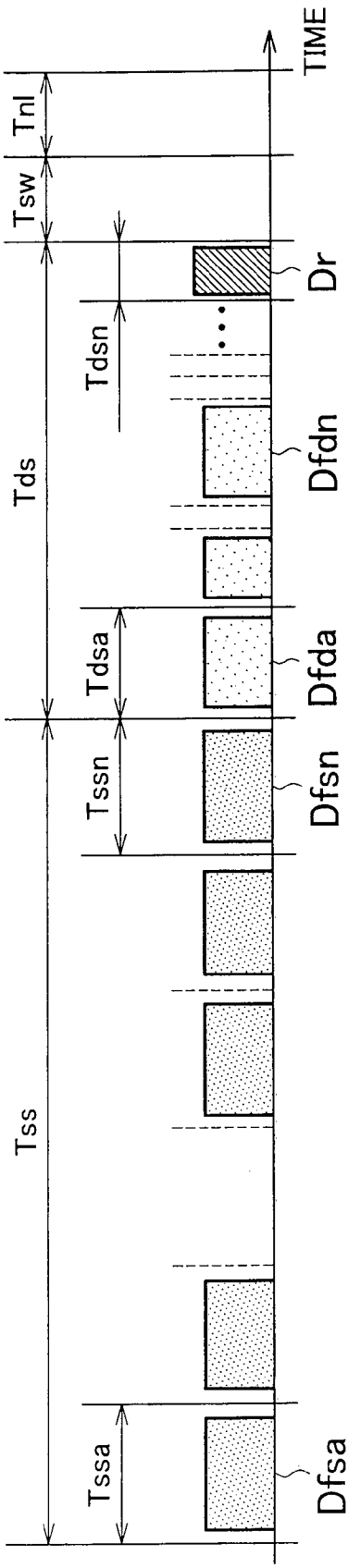

DATA REWRITING SUPPORT SYSTEM AND DATA REWRITING SUPPORT METHOD FOR VEHICLE CONTROL APPARATUS

BACKGROUND OF THE INVENTION

1. Field of the Invention

The invention relates to a data rewriting support system and a data rewriting support method for a vehicle control apparatus, in which data such as control programs and control data used to control the vehicle control apparatus are rewritten (reprogrammed) via a vehicle network.

2. Description of Related Art

In recent years, automobiles and other vehicles are equipped with many vehicle control apparatuses, such as an electronic control unit (ECU) that controls various in-vehicle devices such as an engine and a brake, meters that display various conditions of the vehicle, and ECUs that control auxiliary devices such as doors and air conditioners. These vehicle control apparatuses are connected by a vehicle network (an "in-vehicle LAN") to be capable of mutual communication. When control programs, control data, and so on need to be updated (when data rewriting is required), the vehicle control apparatuses often exchange rewriting data via the in-vehicle LAN.

Data rewriting (reprogramming) must be performed on the vehicle control apparatus via the in-vehicle LAN so that control executed originally by the vehicle control apparatus is not affected. Therefore, in a system described in Japanese Patent Application Publication No. 2009-110528 (JP 2009-110528), for example, rewriting processing is executed in relation to an in-vehicle program of a vehicle when the vehicle is inoperative. By performing data rewriting while the vehicle is inoperative in this manner, a load exerted during the data rewriting does not affect vehicle travel.

Recently, attempts have been made to develop a system which enables the rewriting data to be downloaded to the vehicle from a management center through wireless communication so that data rewriting (reprogramming) using the downloaded data can be executed regardless of the condition of the vehicle.

In another conventional device such as that described in Japanese Patent Application Publication No. 2004-38616 (JP 2004-38616), for example, an operating condition such as a power supply to a reception apparatus to be subjected to an automatic software update is monitored, and a schedule for distributing new software for the automatic software update is determined on the basis of a monitoring result. However, even if the reception apparatus is in an operating condition enabling reception of the new software, the load on the network itself may increase when the new software is transmitted, and as a result, the exchange of data and so on between other apparatuses using the network may be impaired.

SUMMARY OF THE INVENTION

The invention provides a data rewriting support system and a data rewriting support method for a vehicle control apparatus, with which data rewriting is performed smoothly on a vehicle control apparatus while ensuring that data is exchanged between the vehicle control apparatuses connected to a vehicle network.

A first aspect of the invention relates to a data rewriting support system for a vehicle control apparatus. The data rewriting support system includes: a downloading device that downloads data relating to a control program or control data used to control the vehicle control apparatus from outside; and a rewriting data transmission control device that obtains rewriting data on the basis of the data downloaded by the downloading device and transmits the rewriting data to the vehicle control apparatus connected communicably to a vehicle network. The rewriting data transmission control device monitors a transmission condition of data transmitted to the vehicle network and transmits the rewriting data to the vehicle network in accordance with the monitored data transmission condition.

A second aspect of the invention relates to a data rewriting support method for a vehicle control apparatus. The data rewriting support method includes: downloading data relating to a control program or control data used to control the vehicle control apparatus from outside; obtaining rewriting data on the basis of the downloaded data; monitoring a transmission condition of data transmitted to a vehicle network; and transmitting the rewriting data to the vehicle network in accordance with the monitored data transmission condition so that the rewriting data is transmitted to the vehicle control apparatus that is connected communicably to the vehicle network.

According to the above configurations, when the need arises to update or correct the control program and control data incorporated into the vehicle control apparatus, the rewriting data (reprogramming data) used to reprogram the control program and control data is transmitted to the vehicle control apparatus to be subjected to data rewriting (the update subject vehicle control apparatus) using the vehicle network originally used to exchange vehicle data between vehicle control apparatuses. The vehicle network does not normally include a function for confirming the arrival of transmitted data at a transmission destination or a function for retransmitting the transmitted data when a transmission error occurs, and it is therefore highly desired that the vehicle data exchanged between the vehicle control apparatuses be transmitted reliably to a transmission subject vehicle control apparatus. According to the above configurations, the rewriting data is transmitted to the update subject vehicle control apparatus in accordance with the transmission condition of the vehicle network serving as a shared transmission medium that transmits both the rewriting data and vehicle data. Therefore, when the amount of vehicle data exchanged between the respective vehicle control apparatuses, or in other words the amount of vehicle data transmitted to the vehicle network, increases due to variation in a vehicle condition, for example, leading to an increase in the load on the vehicle network, the rewriting data is not transmitted to the vehicle network. In other words, a situation in which the load on the vehicle network becomes excessive due to transmission of the rewriting data to the vehicle network is suppressed. When, on the other hand, the vehicle traveling condition stabilizes such that the load on the vehicle network decreases, for example, the rewriting data is transmitted to the vehicle network and transmitted via the vehicle network to the update subject vehicle control apparatus. Update processing is then executed on the vehicle control apparatus using the rewriting data. Hence, with the configurations described above, even when the load varies in response to the vehicle traveling condition, the rewriting data can be transmitted to the update subject vehicle control apparatus using the vehicle network that is used to transmit vehicle data required to control the vehicle and so on without affecting transmission of the vehicle data that is originally exchanged via the vehicle network. Accordingly, the rewriting data can be transmitted on the basis of a dynamic schedule corresponding to the transmission condition of the vehicle network, which varies in response to the vehicle traveling condition, and therefore the rewriting data can be transmitted more flexibly, enabling an increase in the flexibility of the update processing executed on the vehicle control apparatus. As a result, data rewriting can be performed on the vehicle control apparatuses connected to the vehicle network smoothly while ensuring that required data is exchanged between the vehicle control apparatuses.

In the data rewriting support system, the rewriting data transmission control device may include a prediction module that predicts a schedule of the vehicle network on the basis of the monitored data transmission condition, and the rewriting data transmission control device may determine a transmission timing of the rewriting data in accordance with the schedule predicted by the prediction module.

Further, the data rewriting support method for a vehicle control apparatus may further include: predicting a schedule of the vehicle network on the basis of the monitored data transmission condition; and determining a transmission timing of the rewriting data in accordance with the predicted schedule.

The various vehicle data transmitted to the vehicle network include a large amount of periodically transmitted data, data that are transmitted within a predetermined period as long as the vehicle condition corresponds to a predetermined condition, and so on. Hence, according to the above configurations, the schedule of the vehicle network is predicted from the monitored data transmission condition, and the transmission timing of the rewriting data is determined in accordance with the predicted schedule. In so doing, a timing at which the load on the vehicle network is large and a timing at which the load is small can be predicted, and the rewriting data can be transmitted to the vehicle network at the timing when the load on the vehicle network is predicted to be small. As a result, the rewriting data can be transmitted to the vehicle network at a more accurate timing corresponding to a transmission schedule of the various data transmitted to the vehicle network.

In the data rewriting support system, the rewriting data transmission control device may include a periodically transmitted frame list on which an identifier, a data length, and a transmission period of data transmitted periodically to the vehicle network are registered, and an event transmission frame list on which an identifier and a data length of data transmitted to the vehicle network when an event occurs in the vehicle control apparatus are registered, may predict the schedule of the vehicle network by referring to the periodically transmitted frame list and the event transmission frame list.

Further, in the data rewriting support method, the schedule of the vehicle network may be predicted by referring to the periodically transmitted frame list and the event transmission frame list.

According to the above configurations, it is possible to determine whether data transmitted to the vehicle network is periodically transmitted data or temporarily transmitted data by comparing the identifiers (IDs) of the data registered on the periodically transmitted frame list and the event transmission frame list with an identifier (ID) of the data transmitted to the monitored vehicle network, for example. The schedule of the vehicle network can then be predicted easily on the basis of the data length and transmission period of the determined data. As a result, the prediction can be performed easily and precisely on the basis of the type, data length, and transmission period of the data transmitted to the vehicle network.

In the data rewriting support system, the rewriting data transmission control device may, perform one of re-prediction processing, transmission continuation processing, and error mode shift processing when unpredicted data not included in the predicted schedule is transmitted to the vehicle network. The re-prediction processing may be processing performed to interrupt transmission of the rewriting data and re-predict the schedule of the vehicle network when the unpredicted data is data registered on the periodically transmitted frame list. The transmission continuation processing may be processing performed to continue transmitting the rewriting data when the unpredicted data is data registered on the event transmission frame list. The error mode shift processing may be processing performed to interrupt transmission of the rewriting data and shift to an error mode when the unpredicted data is data not registered on either the periodically transmitted frame list or the event transmission frame list. When predicted data included in the predicted schedule is not transmitted to the vehicle network, on the other hand, the rewriting data transmission control device may perform processing to interrupt transmission of the rewriting data and re-predict the schedule of the vehicle network.

Further, the data rewriting support method for a vehicle control apparatus may further include performing one of the re-prediction processing, transmission continuation processing, and error mode shift processing when unpredicted data not included in the predicted schedule is transmitted to the vehicle network, and may perform processing to interrupt transmission of the rewriting data and re-predict the schedule of the vehicle network when data included in the predicted schedule are not transmitted to the vehicle network.

According to the above configurations, either processing to continue transmitting the rewriting data or processing to re-predict the schedule of the vehicle network is executed as appropriate for each actual transmission condition pattern that can be envisaged in relation to the predicted schedule of the vehicle network. As a result, the predicted schedule and the transmission timing of the rewriting data can be adjusted appropriately so that accurate processing corresponding to the data transmission condition of the vehicle network can be executed.

Further, when the data transmitted to the vehicle network is not registered on either the periodically transmitted frame list or the event transmission frame list, this means that the data is not data that would originally be transmitted to the vehicle network, and it may therefore be estimated that the data is invalid data transmitted from an apparatus connected to the vehicle network illegally, for example. Accordingly, processing such as diagnosis generation or the like may be executed in the error mode in order to suppress doctoring or the like of legitimate programs in the vehicle control apparatuses using the invalid data. Further, when invalid data infiltrate the vehicle network during the process for downloading the rewriting data from outside, the invalid data can be detected early.

Transmission data to be transmitted to the vehicle network may be transmitted to the vehicle network in accordance with a priority level prescribed for the transmission data. In this case, the rewriting data transmission control device may set the priority level of the rewriting data at a lowest level.

According to the above configuration, priority levels are prescribed in advance for the data transmitted to the vehicle network, and the lowest level of priority is set in relation to the rewriting data. The respective data are then transmitted to the vehicle network in accordance with the priority levels.

Therefore, when unexpected vehicle data or the like is transmitted to the vehicle network during transmission of the rewriting data, the vehicle data or the like is transmitted preferentially, thereby avoiding a collision between the vehicle data or the like and the rewriting data. As a result, the vehicle data and the like originally exchanged via the vehicle network can be exchanged more reliably when the rewriting data is transmitted to the vehicle control apparatus via the vehicle network.

Further, when the rewriting data are transmitted on the basis of the predicted schedule of the vehicle network, collisions between the rewriting data and the various vehicle data and so on due to prediction errors can be suppressed.

A third aspect of the invention relates to a data rewriting support system for a vehicle control apparatus. The data rewriting support system includes: a downloading device that downloads data relating to a control program or control data used to control the vehicle control apparatus from outside; and a rewriting data transmission control device that obtains rewriting data on the basis of the data downloaded by the downloading device and transmits the rewriting data to the vehicle control apparatus connected communicably to a vehicle network. When transmission data to be transmitted to the vehicle network is transmitted to the vehicle network in accordance with a priority level prescribed for the transmission data, the rewriting data transmission control device sets the priority level of the rewriting data at a lowest level and transmits the rewriting data to the vehicle network.

A fourth aspect of the invention relates to a data rewriting support method for a vehicle control apparatus. The data rewriting support method includes: downloading data relating to a control program or control data used to control the vehicle control apparatus from outside; obtaining rewriting data on the basis of the downloaded data; when transmission data to be transmitted to the vehicle network is transmitted to the vehicle network in accordance with a priority level prescribed for the transmission data, setting the priority level of the rewriting data at a lowest level; and transmitting the rewriting data to the vehicle network so that the rewriting data is transmitted to the vehicle control apparatus that is connected communicably to the vehicle network.

According to the above configurations, priority levels are prescribed in advance for the data transmitted to the vehicle network, and the lowest level of priority is set in relation to the rewriting data. The respective data are then transmitted to the vehicle network in accordance with the respective prescribed priority levels of the data so that the various vehicle data and so on that are originally exchanged via the vehicle network can be handled preferentially over the rewriting data. Hence, when the vehicle data and so on is transmitted to the vehicle network during transmission of the rewriting data, the vehicle data and so on is transmitted preferentially, thereby avoiding a collision between the vehicle data or the like and the rewriting data. Accordingly, the rewriting data can be transmitted to the update subject vehicle control apparatus using an available period not used by the vehicle network to transmit the vehicle data and so on. As a result, data rewriting can be performed on the vehicle control apparatuses connected to the vehicle network smoothly while ensuring that data are exchanged between the vehicle control apparatuses.

In the data rewriting support system, the vehicle network may be a control area network that transmits the data using an event-triggered system, and the rewriting data transmission control device may transmit the rewriting data at a timing when data other than the rewriting data are not transmitted.

Further, in the data rewriting method, the vehicle network may be the control area network, and the rewriting data may be transmitted at a timing when data other than the rewriting data are not transmitted.

A control area network (CAN) is often used as the vehicle network. In a control area network, the various vehicle data are exchanged in response to the occurrence of various events. Hence, according to the above configurations, by monitoring the condition of data transmission to the control area network, the rewriting data can be transmitted at a timing when the various vehicle data, or in other words data other than the rewriting data, is not transmitted. As a result, it is possible to achieve both reliable exchange of the various vehicle data via the control area network and smooth exchange of the rewriting data favorably.

In the data rewriting support system, the vehicle network may be a FlexRay having a communication cycle that includes a static segment in which prescheduled static data is transmitted and a dynamic segment in which dynamic data is transmitted in response to occurrence of an event, and the rewriting data transmission control device may transmit the rewriting data in the dynamic segment.

Further, in the data rewriting method, the vehicle network may be the FlexRay, and the rewriting data may be transmitted in the dynamic segment.

The communication cycle of a FlexRay is constituted mainly by a static segment and a dynamic segment. The dynamic segment is used to transmit, for example, data required temporarily when the vehicle transits to a specific condition and various vehicle data required periodically until a predetermined condition is satisfied after the vehicle transits to the specific condition. According to the above configurations, the data transmission condition of the FlexRay is monitored, and when it is confirmed on the basis of the monitoring result that an available period exists in the dynamic segment, the rewriting data is transmitted in the dynamic segment. As a result, rapid exchange of the various vehicle data and smooth exchange of the rewriting data can be realized with a FlexRay capable of transmitting data at high speed and extremely reliably.

In the data rewriting support system, the downloading device may download the data relating to the control program or the control data used to control the vehicle control apparatus from a management center either through wireless communication or through wired communication via a storage medium.

Further, in the data rewriting support method, the data relating to the control program or the control data used to control the vehicle control apparatus may be downloaded from a management center either through wireless communication or through wired communication via a storage medium.

According to the above configurations, the rewriting data of the vehicle control apparatus are downloaded from the management center that manages the data either through wireless communication or through wired communication via a storage medium such as a universal serial bus (USB) memory. Therefore, dynamic transmission of the rewriting data using the vehicle network can be promoted. Further, exchange of the rewriting data, and therefore update processing of the update subject vehicle control apparatus, can be performed smoothly regardless of the vehicle traveling condition.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a time chart showing an example of a communication cycle of a FlexRay;

FIG. 8A is a time chart showing the communication cycle of the FlexRay in detail, and FIG. 8B is a time chart showing an example of an operation for transmitting a data frame of rewriting data according to the second embodiment.

DETAILED DESCRIPTION OF EMBODIMENTS

First Embodiment

A specific first embodiment of a data rewriting support system and a data rewriting support method for a vehicle control apparatus according to the aspect of the invention will be described below with reference to FIGS. 1 to 5D. Note that in this embodiment, signals are exchanged between vehicle control apparatuses via a Control Area Network (CAN) on which various data are exchanged using an Event-Triggered system.

Figure 1:
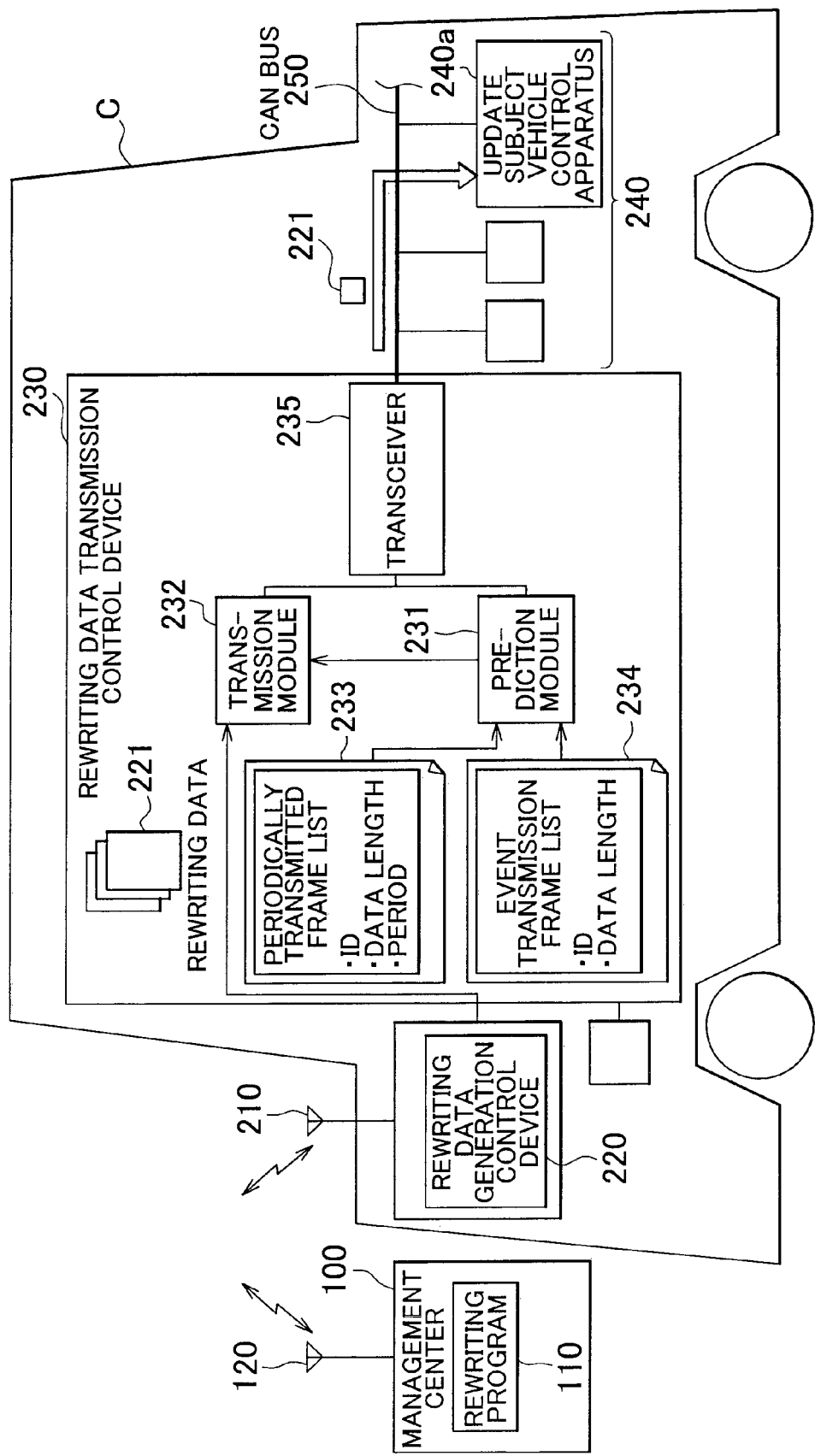
FIG. 1 is a block diagram showing a schematic configuration of a system according to a first embodiment.

As shown in FIG. 1, a system to which the data rewriting support system and the data rewriting support method for a vehicle control apparatus are applied includes a management center 100 that performs wireless communication with a vehicle C equipped with vehicle control apparatuses (ECUs) 240 that control various in-vehicle devices.

The management center 100 generates a rewriting program 110 constituted by a control program and/or control data used to control the vehicle control apparatuses 240 installed in the vehicle C. The rewriting program 110 is generated in accordance with specifications and so on of the vehicle control apparatuses 240 installed in the vehicle C. The rewriting program 110 is constituted by data used to reprogram (data-rewrite) control programs such as application programs and/or control data incorporated into the vehicle control apparatuses 240 when the need arises to update or correct the control programs and/or control data.

The management center 100 generates the rewriting program 110 as appropriate when the need arises to update or correct the control programs and/or control data incorporated into the vehicle control apparatuses 240. Further, the management center 100 includes a center communication device 120 for distributing the rewriting program 110 generated by the management center 100 to the vehicle C. The management center 100 distributes the generated rewriting program 110 as appropriate to the vehicle C equipped with the vehicle control apparatus 240 (240a) to be subjected to reprogramming.

The vehicle C includes a vehicle communication device 210 that downloads the rewriting program 110 from the management center 100 through wireless communication with the management center 100. After downloading the rewriting program 110 from the management center 100, the vehicle communication device 210 outputs the downloaded rewriting program 110 to a rewriting data generation control device 220.

The rewriting data generation control device 220 is constituted by resources such as a calculation processing device and a memory. The rewriting data generation control device 220 functions as a so-called high difficulty diagnosis device used by automobile dealers for reprogramming. The rewriting data generation control device 220 generates rewriting data (reprogramming data) 221 to be used to reprogram the vehicle control apparatus 240 requiring the update or correction on the basis of the rewriting program 110 after obtaining the rewriting program 110 from the vehicle communication device 210. The rewriting data generation control device 220 then outputs the rewriting data 221 to a rewriting data transmission control device 230 for transmitting the rewriting data 221 to the reprogramming subject vehicle control apparatus 240. In this embodiment, the rewriting data generation control device 220 is installed in the vehicle C, and therefore reprogramming of the vehicle control apparatuses 240 installed in the vehicle C can be realized without using a specialized instrument such as a high difficulty diagnosis device.

The rewriting data transmission control device 230 is provided between the rewriting data generation control device 220 and a CAN bus 250. The CAN bus 250 forms a control area network (CAN) that electrically connects the respective vehicle control apparatuses 240 of a vehicle control system to each other. Signals are conveyed by the CAN bus 250 on the basis of differential voltages. The rewriting data transmission control device 230 includes a prediction module 231 that monitors a data transmission condition of the CAN bus 250 and predicts the data transmission condition of the CAN bus 250 on the basis of a monitoring result. The rewriting data transmission control device 230 according to this embodiment also includes a transmission module 232 that converts the rewriting data 221 into a data frame and transmits the data frame to the update subject (data rewriting subject) vehicle control apparatus 240 (240a) at a predetermined timing. The data frame is in a file format required to transfer data on the CAN bus 250. Furthermore, the rewriting data transmission control device 230 according to this embodiment includes a periodically transmitted frame list 233 and an event transmission frame list 234 on which data frames that travel on the CAN bus 250 are registered in advance. The rewriting data transmission control device 230 also includes a transceiver 235. The transceiver 235 is provided between the CAN 250 and the prediction module 231 and transmission module 232 in order to execute digital signal/differential voltage conversion processing.

The prediction module 231 monitors the transmission condition of the data traveling on the CAN bus 250 (the condition of data transmission to the CAN bus 250) on the basis of a digital signal converted by the transceiver 235. Further, the prediction module 231 calculates a predicted schedule, which is a schedule showing data to be transmitted to the CAN bus 250, on the basis of a monitoring result. The prediction module 231 according to this embodiment uses the periodically transmitted frame list 233 and the event transmission frame list 234 to calculate the predicted schedule. Identifiers (IDs), data lengths, and transmission periods of periodically transmitted data frames are registered in advance on the periodically transmitted frame list 233. A periodically transmitted data frame is a data frame, of the data frames traveling on the CAN bus 250, that travels on the CAN bus 250 periodically. Further, identifiers and data lengths of event transmission data frames are registered in advance on the event transmission frame list 234. An event transmission data frame is a data frame, of the data frames traveling on the CAN bus 250, that travels on the CAN bus 250 non-periodically when an event such as a vehicle operation by a driver of the vehicle C occurs.

The prediction module 231 determines the type, data length, transmission period, and so on of a data frame traveling on the CAN bus 250 by referring to the periodically transmitted frame list 233 and the event transmission frame list 234, and predicts the schedule of the CAN bus 250 on the basis of a determination result. Further, the prediction module 231 outputs information relating to an occurrence timing of an available period, during which it is predicted that a periodically transmitted data frame, for example, will not be transmitted, to the transmission module 232 on the basis of the predicted schedule serving as a prediction result.

The prediction module 231 according to this embodiment monitors the CAN bus 250 and calculates the predicted schedule only when the rewriting data transmission control device 230 holds the rewriting data 221 to be transmitted to the vehicle control apparatus 240. Further, a single monitoring period during which the prediction module 231 according to this embodiment monitors the CAN bus 250 is set at least at a longer period than the period of the periodically transmitted data frame having the greatest length, of the periodically transmitted data frames registered in the periodically transmitted frame list 233. Hence, by monitoring the CAN bus 250 for the monitoring period, the prediction module 231 can determine accurately whether or not a periodically transmitted data frame is traveling on the CAN bus 250.

A load of the CAN bus 250 may vary according to a traveling condition of the vehicle C. Therefore, when the rewriting data 221 to be transmitted on the CAN bus 250 exists, the prediction module 231 according to this embodiment continues to monitor the condition of the CAN bus 250 even after calculation of the predicted schedule of the CAN bus 250 is complete. By continuing to monitor the CAN bus 250 whenever necessary in this manner, the prediction module 231 confirms that a predicted value (the predicted schedule) is consistent with an actually measured value and thereby verifies the correctness of the predicted value.

The transmission module 232 converts the rewriting data 221 input from the rewriting data generation control device 220 into a data frame, and then sets the occurrence timing of an available period in the CAN bus 250, indicated by the information obtained from the prediction module 231, as a transmission timing of the data frame. The transmission module 232 transmits the rewriting data 221 while taking a monitoring load accompanying the occurrence of abnormalities in the respective vehicle control apparatuses 240 and so on, an error load accompanying noise generation, a load exerted by the event transmission data frames, and so on into consideration so that traffic on the CAN bus 250 remains within a predetermined usage rate (load) (no more than 30 to 40%). In so doing, excessive data frame transmission on the CAN bus 250 is suppressed even when an available period during which the data frame of the rewriting data 221 can be transmitted exists in the CAN bus 250. As a result, the load on the CAN bus 250 can be reliably prevented from becoming excessive.

At the determined timing, the transmission module 232 transmits the data frame of the rewriting data 221 to the CAN bus 250 via the transceiver 235. As a result, the data frame of the rewriting data 221 is transmitted to the update subject vehicle control apparatus 240a via the CAN bus 250.

Hence, in this embodiment, the data frame of the rewriting data 221 required to reprogram the vehicle control apparatus 240 and data frames of various vehicle data exchanged between the respective vehicle control apparatuses 240 are transmitted and received via the CAN bus 250 serving as a shared transmission medium. Further, in this embodiment, the data frame of the rewriting data 221 is transmitted to the CAN bus 250 at a timing when the load on the CAN bus 250 is small, and therefore the load exerted on the CAN bus 250 while transmitting and receiving the data frame of the rewriting data 221 is minimized. Hence, the data frames of the vehicle data and the data frame of the rewriting data 221 can both be exchanged favorably via the CAN bus 250 serving as the transmission medium even when the CAN bus 250 is shared. Note that on the CAN bus 250, the data frame of the rewriting data 221 is handled similarly to an event transmission data frame.

A data amount of the vehicle data exchanged via the CAN bus 250, or in other words the usage rate (load) of the CAN bus 250, varies according to the traveling condition of the vehicle C. In this embodiment, however, the data frame of the rewriting data 221 is transmitted by the transmission module 232 at a timing when the load on the CAN bus 250 is predicted to be low, regardless of the traveling condition of the vehicle C. According to this embodiment, therefore, as long as an available period in which the load on the CAN bus 250 is low exists, the data frame of the rewriting data 221 can be transmitted to the update subject vehicle control apparatus 240a using the available period even when the vehicle C is traveling. Hence, in the respective vehicle control apparatuses 240, the control programs, control data, and so on incorporated into the vehicle control apparatuses 240 can be updated, corrected, and the like on the basis of the rewriting program 110 transmitted from the management center 100 without being restricted by the traveling condition of the vehicle C.

The rewriting data transmission control device 230 allocates an identifier (ID) determined in advance with respect to the vehicle C to the data frame of the rewriting data 221 as information indicating the content of the data frame. As shown by the specific examples in FIG. 2, identifiers "0x0" to "0x7FF" having an 11-bit length, for example, are used as the IDs. Of these IDs, vehicle data B indicating information to be displayed on a meter installed in the vehicle C, for example, are associated with an ID "0x1", and the rewriting data 221 are associated with the ID "0x7FF".

The rewriting data transmission control device 230 according to this embodiment sets a value of the ID of the data frame of the rewriting data 221 at a larger value ("0x7FF") than values of the respective IDs registered in the periodically transmitted frame list 233 and the event transmission frame list 234. As a result, as is evident from FIG. 2, the value ("0x7FF") of the ID allocated to the data frame of the rewriting data 221 has the greatest value of the IDs of the data frames that travel on the CAN bus 250. The rewriting data transmission control device 230 according to this embodiment reduces a transmission priority level as the value of the ID of the data frame increases. Accordingly, the priority level on the CAN bus 250 of the data frame of the rewriting data 221 having the maximum ID value is set at a lowest level of priority among the data frames that travel on the CAN bus 250. Hence, the data frames of the vehicle data exchanged between the respective vehicle control apparatuses 240 are handled (transmitted) preferentially over the data frame of the rewriting data 221. As a result, collisions between the data frames of the various vehicle data and so on and the data frame of the rewriting data 221 on the CAN bus 250 serving as the shared transmission medium are avoided. According to this embodiment, therefore, the data frames of the vehicle data and so on exchanged between the respective vehicle control apparatuses 240 can be exchanged accurately by performing a communication adjustment based on the priority level.

The vehicle control apparatuses 240 are electronic control units (ECU) of the vehicle control system, for example, and correspond to nodes of the control area network. The vehicle control apparatuses 240 are constituted by an engine control apparatus for controlling an engine installed in the vehicle C, a steering control apparatus for controlling steering, meter control apparatuses for controlling meters, and so on, for example. Various vehicle data indicating vehicle information to be displayed on the meters, control amounts of the engine and a brake, and so on are exchanged between the respective vehicle control apparatuses 240 as appropriate via the CAN bus 250. Further, each vehicle control apparatus 240 is provided with an ID filter for selectively obtaining data frames transmitted via the CAN bus 250. Each vehicle control apparatus 240 having the ID filter can selectively obtain a data frame having an ID that matches a specific ID. In this embodiment, the ID filter of each vehicle control apparatus 240 is configured to be capable of receiving the data frame of the corresponding rewriting data 221. When the data frame of the rewriting data 221 is transmitted to the CAN bus 250 from the transmission module 232, the reprogramming subject vehicle control apparatus 240a obtains the data frame of the rewriting data 221 transmitted by the CAN bus 250. The reprogramming subject vehicle control apparatus 240a is then reprogrammed using the obtained data frame of the rewriting data 221. As a result, the control programs, control data, and so on incorporated into the reprogramming subject vehicle control apparatus 240a are updated and corrected appropriately.

Figures 2, 3:
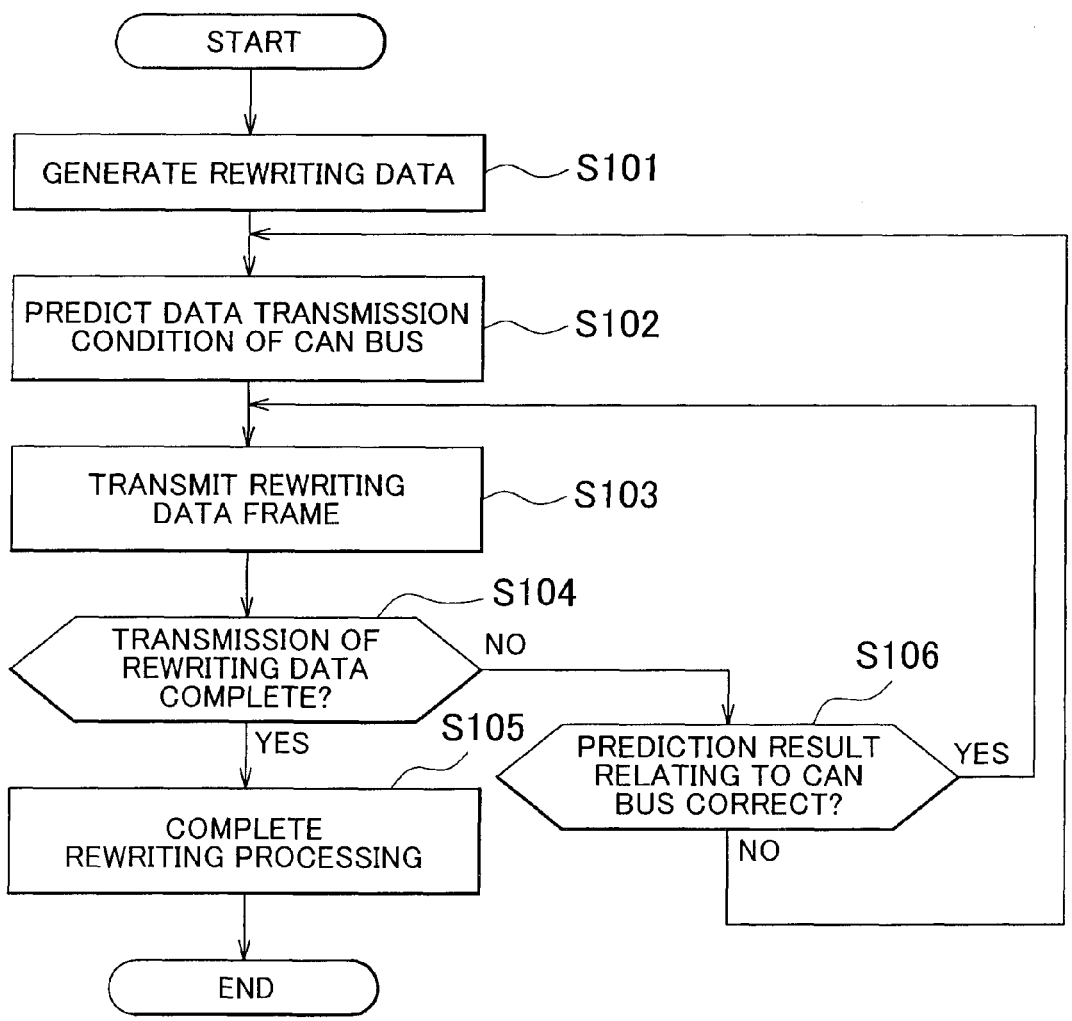
FIG. 2 is a view showing examples of IDs allocated to data frames transmitted to a CAN bus.
FIG. 3 is a flowchart showing a procedure for transmitting rewriting data according to the first embodiment.

Next, processing for transmitting the rewriting data 221 using the data rewriting support system and data rewriting support method for a vehicle control apparatus according to this embodiment will be described with reference to FIG. 3. As shown in FIG. 3, in this processing, when the vehicle communication device 210 of the vehicle C receives the rewriting program 110 transmitted from the management center 100, the rewriting data generation control device 220 generates the rewriting data 221 on the basis of the rewriting program 110 obtained from the management center 100 (Step S101). Next, the prediction module 231 monitors the condition of data (data frame) transmission to the CAN bus 250, and predicts the condition of data transmission to the CAN bus 250 (the data transmission schedule) on the basis of the monitoring result (Step S102). The prediction module 231 then notifies the transmission module 232 of information relating to a timing at which the load on the CAN bus 250 is predicted to be low, for example. The transmission module 232 converts the rewriting data 221 into a data frame, and transmits the data frame to the CAN bus 250 at the timing notified by the prediction module 231 (Step S103).

Next, the prediction module 231 determines whether or not transmission of the data frame of the rewriting data 221 is complete (Step S104), and after determining that transmission of the data frame of the rewriting data 221 is complete, terminates the processing (Step S104: YES, S105).

When the prediction module 231 determines that transmission of the data frame of the rewriting data 221 is not complete, on the other hand, the prediction module 231 monitors the condition of data transmission to the CAN bus 250 again, and determines, on the basis of the monitoring result, whether or not an actually measured value is consistent with the predicted value (predicted schedule) predicted in the previous Step S104 (i.e. whether or not the predicted value is correct) (Step S104: NO, S106). After determining that the predicted value is correct, the prediction module 231 causes the transmission module 232 to continue transmitting the data frame of the rewriting data 221 on the basis of the same predicted timing (Step S106: YES, S103). When the prediction module 231 determines that the predicted value is not correct, on the other hand, the prediction module 231 predicts the transmission condition of the data frames traveling on the CAN bus 250 anew by monitoring the CAN bus 250. The prediction module 231 then causes the transmission module 232 to transmit the data frame of the rewriting data 221 on the basis of the prediction result (Step S106: NO, S102).

Figure 4:
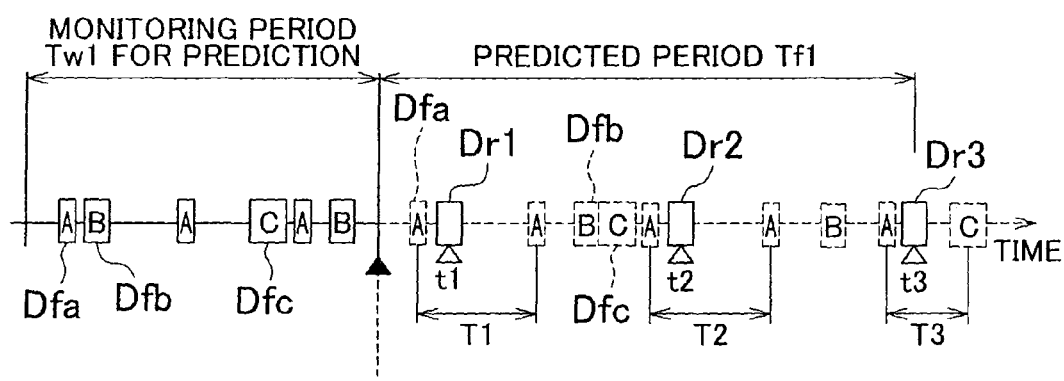
FIG. 4 is a time chart showing an example of an operation for transmitting a data frame of the rewriting data according to the first embodiment.

An example of an operation performed by the data rewriting support system for a vehicle control apparatus according to this embodiment will now be described with reference to FIGS. 4 to 6. When the rewriting data transmission control device 230 obtains the rewriting data 221, the prediction module 231 monitors the data transmission condition of the CAN bus 250 for a monitoring period Tw1, as shown in FIG. 4. The monitoring period Tw1 is a longer period than the period of the longest data frame registered in the periodically transmitted frame list 233. As a result, the prediction module 231 determines that three data frames Dfa, Dfb, Dfc having predetermined data lengths travel on the CAN bus 250 at predetermined periods.

The prediction module 231 determines that the respective data frames Dfa, Dfb, Dfc traveling on the CAN bus 250 are periodically transmitted data frames by comparing the respective IDs of the data frames Dfa, Dfb, Dfc with the IDs registered in the periodically transmitted frame list 233 and the event transmission frame list 234. Further, the prediction module 231 determines the data lengths and the transmission periods of the respective data frames Dfa, Dfb, Dfc on the basis of the comparison result. Then, as shown in FIG. 4, the prediction module 231 predicts the schedule of the CAN bus 250 during a predicted period Tf1, for example, on the basis of the determination result. More specifically, the prediction module 231 predicts that the three data frames Dfa, Dfb, Dfc will travel on the CAN bus 250 periodically and that available periods T1 to T3 will occur. The prediction module 231 then notifies the transmission module 232 of information relating to the available periods T1 to T3 during which the load on the CAN bus 250 is predicted to be low.

Next, the transmission module 232 transmits respective data frames Dr1 to Dr3 of the rewriting data 221 to the CAN bus 250 at timings t1 to t3 within the respective available periods T1 to T3 on the basis of the information obtained from the prediction module 231.

Figure 5A:
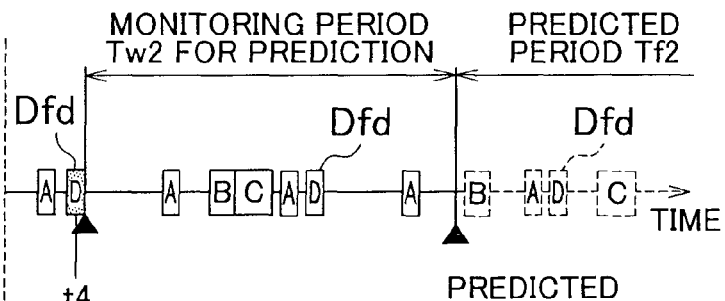
FIG. 5A is a time chart showing an example of the operation for transmitting the data frame of the rewriting data when an unpredicted periodically transmitted data frame is transmitted to the CAN bus.

Meanwhile, when the predicted period Tf1 elapses, as shown in FIG. 5A, the prediction module 231 monitors the data frame transmission condition of the CAN bus 250 during the prediction period Tf1 to verify that the predicted value is consistent with the actually measured value. In other words, the prediction module 231 determines whether or not the calculated predicted schedule is correct. If, as a result, a periodically transmitted data frame Dfd not detected in the monitoring period Tw1 is newly detected at a timing t4 within the predicted period Tf1, for example, the prediction module 231 monitors the data frames traveling on the CAN bus 250 again for a monitoring period Tw2 in order to predict the transmission condition of the CAN bus 250 anew. The prediction module 231 then calculates a new predicted schedule including the periodically transmitted data frame Dfd for a predicted period Tf2 on the basis of the monitoring result obtained in the monitoring period Tw2, and notifies the transmission module 232 of information indicating available periods of the CAN bus 250 determined from the predicted schedule. The transmission module 232 corrects the transmission timing of the data frame of the rewriting data 221 on the basis of the information indicating the newly notified available periods from the prediction module 231, and transmits the data frame of the rewriting data 221 at the corrected transmission timing.

Figure 5B:
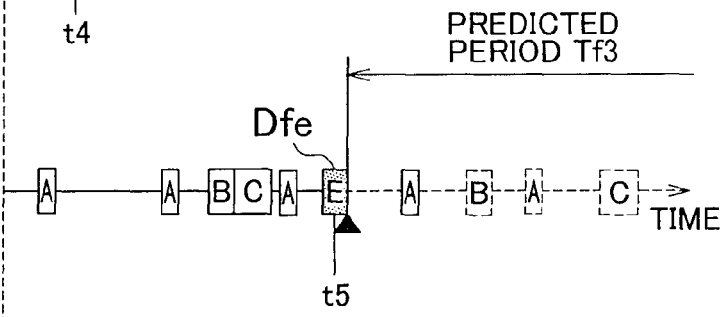
FIG. 5B is a time chart showing an example of the operation for transmitting the data frame of the rewriting data when an unpredicted event transmission data frame is transmitted to the CAN bus.

As shown in FIG. 5B, when a data frame Dfe not detected in the monitoring period Tw1 is detected anew at a timing t5 and the detected data frame Dfe is an event transmission data frame accompanying the occurrence of an event in the vehicle C, the data frame Dfe is determined to be a data frame that must temporarily be transmitted. Accordingly, the prediction module 231 does not include the data frame Dfe into the predicted schedule of a predicted period Tf3. Note that in this case also, the data frame of the rewriting data 221 is transmitted only when the traffic on the CAN bus 250 remains sufficiently light (when the usage rate is between 30 and 40%) even after taking into account the load accompanying transmission of the event transmission data frame and so on, and therefore the load on the CAN bus 250 is prevented from becoming excessive.

Figure 5C:
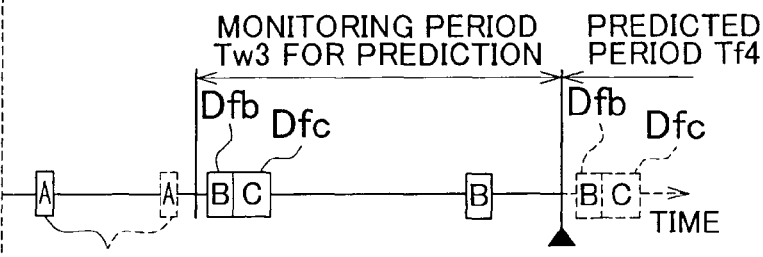
FIG. 5C is a time chart showing an example of the operation for transmitting the data frame of the rewriting data when a predicted periodically transmitted data frame is not transmitted to the CAN bus.

Further, as shown in FIG. 5C, when the periodically transmitted data frame Dfa predicted to be transmitted in the predicted period Tf1 is not transmitted, the prediction module 231 monitors the data frame transmission condition of the CAN bus 250 again for a monitoring period Tw3. When the periodically transmitted data frame Dfa is not detected during the monitoring period Tw3 either, it may be determined that the traveling condition of the vehicle C has varied, for example, leading to variation in the condition of the CAN bus 250. Accordingly, the prediction module 231 recalculates the predicted schedule so as to exclude the periodically transmitted data frame Dfa in a predicted period Tf4.

Hence, the data frame transmission condition on the CAN bus 250 varies appropriately in accordance with the traveling condition of the vehicle C. In this embodiment, however, the transmission timing of the data frame of the rewriting data 221 can be corrected appropriately by verifying the predicted value, and therefore data frame transmission can be performed in accordance with variation in the load on the CAN bus 250.

Figure 5D:
FIG. 5D is a time chart showing an example of the operation for transmitting the data frame of the rewriting data when an invalid data frame is transmitted to the CAN bus.

Further, according to this embodiment, the prediction module 231 monitors the CAN bus 250 on the basis of the periodically transmitted frame list 233 and the event transmission frame list 234, and therefore the validity of the data frames traveling on the CAN bus 250 can also be monitored. More specifically, as shown in FIG. 5D, when a data frame Dfn detected while monitoring the CAN bus 250 is not registered in either of the frame lists 233 and 234, it can be determined that the data frame Dfn is an invalid data frame transmitted from a vehicle control apparatus or the like incorporated into the vehicle C illegally. In this case, the rewriting data transmission control device 230 determines that an invalid vehicle control apparatus is connected to the CAN bus 250 and shifts to an error mode. In the error mode, the rewriting data transmission control device 230 transmits diagnostic information indicating the occurrence of an abnormality in the vehicle C, for example, to the management center 100, an information terminal device held by a user of the vehicle C, or the like.

As described above, with the data rewriting support system and data rewriting support method for a vehicle control apparatus according to this embodiment, following effects are obtained. (1) The rewriting data 221 generated on the basis of the rewriting program 110 downloaded from the management center 100 is transmitted to the CAN bus 250 in accordance with the condition of data transmission to the CAN bus 250. Therefore, when the rewriting data 221 are transmitted to the update subject vehicle control apparatus 240a via the CAN bus 250 used originally to exchange vehicle data, an increase in the load of the CAN bus 250 can be suppressed. As a result, data rewriting can be performed on the vehicle control apparatuses 240 connected to the CAN bus 250 smoothly while ensuring that various vehicle data and the like are exchanged between the vehicle control apparatuses 240.

(2) The predicted schedule of the CAN bus 250 is calculated by monitoring the condition of data frame transmission to the CAN bus 250. A timing at which the load on the CAN bus 250 is predicted to be low according to the calculated predicted schedule is then set as the transmission timing of the data frame of the rewriting data 221. As a result, the data frame of the rewriting data 221 can be transmitted to the CAN bus 250 at a more appropriate timing corresponding to the transmission schedule of the various data.

(3) The correctness of the predicted schedule is verified on the basis of a comparison between the predicted schedule of the CAN bus 250 and the actual data transmission condition of the CAN bus 250. The verification result can then be used to predict the schedule of the CAN bus 250 anew, adjust the transmission timing of the rewriting data, and so on. As a result, it is possible to achieve both an improvement in a prediction precision of the prediction module 231 and increased correctness in the timing at which the transmission module 232 transmits the rewriting data.

(4) The rewriting data transmission control device 230 includes the periodically transmitted frame list 233 and the event transmission frame list 234. The prediction module 231 calculates the predicted schedule by referring to the periodically transmitted frame list 233 and the event transmission frame list 234. Hence, by comparing the IDs of the data registered in the periodically transmitted frame list 233 and the event transmission frame list 234 with the ID of data transmitted on the CAN bus 250, the type, data length, and transmission period of the data transmitted on the CAN bus 250 can be specified. As a result, the predicted schedule can be calculated easily and with a higher degree of precision on the basis of the specified type, data length, and transmission period of the transmitted data.

(5) Either processing to continue transmitting the data frame of the rewriting data 221 or processing to recalculate the predicted schedule is executed in accordance with actual data transmission condition patterns that can be envisaged in relation to the predicted schedule. As a result, the predicted schedule and the transmission timing of the rewriting data are adjusted appropriately so that accurate processing corresponding to the data transmission condition of the vehicle network can be executed at all times.

(6) When the data transmitted to the CAN bus 250 are data not registered in either the periodically transmitted frame list 233 or the event transmission frame list 234, these data are considered to be invalid data, and the processing shifts to the error mode. In so doing, doctoring or the like of legitimate programs in the vehicle control apparatuses 240 using invalid data is suppressed. Further, when invalid data infiltrate the CAN bus 250 or the like during the process for downloading the rewriting program 110 from the management center 100, the invalid data can be detected early. In other words, system security can be maintained when the rewriting program 110 is obtained from outside.

(7) When transmitting the data frame of the rewriting data 221 to the CAN bus 250, the lowest level of priority is set in relation to the data frame of the rewriting data 221. In so doing, the vehicle data and so on can be exchanged more reliably when transmitting the data frame of the rewriting data 221 to the CAN bus 250. Further, when the data frame of the rewriting data 221 is transmitted on the basis of the predicted schedule generated by the prediction module 231, data frame collisions due to prediction errors are reliably avoided.

(8) A CAN is used as the vehicle network, and the data frame of the rewriting data 221 is transmitted at a timing when a transmission event relating to a data frame other than the data frame of the rewriting data 221 has not occurred. As a result, it is possible to realize both reliable exchange of the various vehicle data and smooth exchange of the rewriting data favorably via the CAN that exhibits great versatility as a vehicle network.

(9) The rewriting program 110 is downloaded to the vehicle C from the management center 100 through wireless communication. Therefore, as long as communication with the management center 100 can be established, the rewriting program 110 can be obtained with no place and time restrictions, regardless of the traveling condition of the vehicle C equipped with the update subject vehicle control apparatus 240. As a result, reprogramming of the vehicle control apparatus 240 using the rewriting program 110 can be performed with a higher degree of freedom. Further, as a synergistic effect with (1), reprogramming of the vehicle control apparatus 240 can be performed more flexibly.

Second Embodiment

A specific second embodiment of the data rewriting support system and the data rewriting support method for a vehicle control apparatus according to the aspect of the invention will be described below with reference to FIGS. 6 to 8. The second embodiment shares a basic configuration with the first embodiment but differs therefrom in that a FlexRay employing a time-triggered system is used as the vehicle network.

Figure 6:
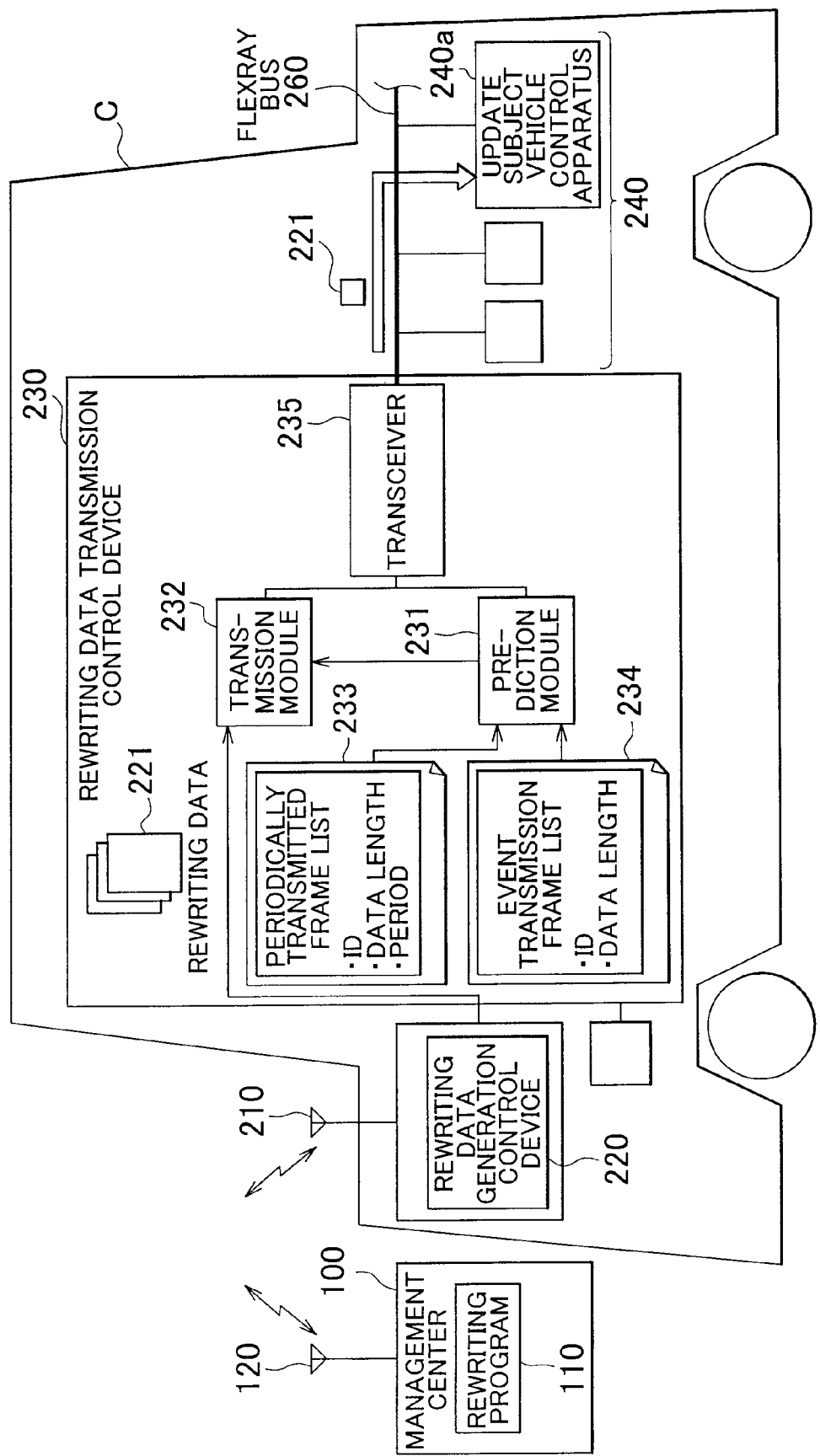
FIG. 6 is a block diagram showing a schematic configuration of a system according to a second embodiment.

FIG. 6 shows an example of the configuration of a system to which the data rewriting support system and data rewriting support method for a vehicle control apparatus according to the second embodiment are applied. Note that in FIG. 6, identical elements to the respective elements shown in FIG. 1 have been allocated identical reference numerals, and duplicate description of these identical elements has been omitted.

As shown in FIG. 6, the system to which the data rewriting support system and data rewriting support method for a vehicle control apparatus according to this embodiment are applied uses a single channel type FlexRay bus 260 instead of the CAN bus 250. The single channel type FlexRay bus 260 is constituted by a pair of unshielded twisted pair (UTP) cables, for example. The rewriting data transmission control device 230 and the respective vehicle control apparatuses 240 are connected by the FlexRay bus 260 to be capable of mutual communication. In this embodiment also, the data transmitted from the rewriting data transmission control device 230 and the respective vehicle control apparatuses 240 are conveyed on the basis of differential voltages, for example, and various data are exchanged in a predetermined communication cycle.

As shown in FIG. 7, a communication cycle of the FlexRay is constituted mainly by a static segment Tss and a dynamic segment Tds in which various types of data are transmitted. Further, the communication cycle includes a symbol window Tsw used as an option during startup and wake-up, and a network idle time Tnl used to offset clock synchronization, calculate or correct an error in a transmission speed, and so on. By repeating the communication cycle appropriately from a point at which an ignition of the vehicle C is switched ON to a point at which the ignition is switched OFF, data are exchanged between the rewriting data transmission control device 230 and the vehicle control apparatuses 240 or between the respective vehicle control apparatuses 240.

As shown in FIG. 8A, the static segment Tss is a segment that is prepared in order to transmit data in a fixed period on the basis of a time trigger. The static segment Tss is constituted by a plurality of static slots Tssa to Tssn constituting a slot group having a fixed length. Of the data frames exchanged between the respective vehicle control apparatuses 240, periodically transmitted data frames Dfsa to Dfsn are allocated to the respective static slots Tssa to Tssn. In other words, the static segment Tss is used as a period for transmitting the periodically transmitted data frames.

The dynamic segment Tds is a segment that is prepared in order to transmit data non-synchronously on the basis of an event trigger. The dynamic segment Tds is constituted by a plurality of mini-slots Tdsa to Tdsn constituting a slot group having a variable length. Of the data frames exchanged between the respective vehicle control apparatuses 240, event transmission data frames Dfda to Dfdc are allocated to the respective mini-slots Tdsa to Tdsc as necessary, for example. Further, in this embodiment, the data frame of the rewriting data 221 is transmitted and received using the dynamic segment Tds. In other words, the dynamic segment Tds according to this embodiment is used as a period for transmitting the event transmission data frames and the data frame of the rewriting data 221. Note that in the dynamic segment Tds, a mini-slot closer to a start position of the dynamic segment Tds is allocated to a data frame having a higher priority level. Hence, when the data frame of the rewriting data 221 is transmitted according to this embodiment, the priority level thereof is set at the lowest level so that the mini-slot Tdsn closest to an end position of the dynamic segment Tds is allocated to transmission of the data frame of the rewriting data 221.

The symbol window Tsw, meanwhile, is used for signaling when maintenance is performed on the FlexRay bus 260 or when the network is started. Further, the network idle time Tnl is used while the FlexRay bus 260 is idle mainly to maintain synchronization between clocks of nodes.

An example of an operation performed by the data rewriting support system for a vehicle control apparatus according to this embodiment will be described below with reference to FIG. 8B on the basis of the presuppositions described above. First, after obtaining the rewriting data 221 generated by the rewriting data generation control device 220, the rewriting data transmission control device 230 causes the prediction module 231 to monitor the condition of data transmission to the FlexRay bus 260. In this embodiment, for example, the dynamic segment Tds of each communication cycle is set as a monitoring period for transmitting a data frame Dr of the rewriting data 221.

When the prediction module 231 confirms that an available period exists in the dynamic segment Tds by monitoring the condition of data transmission to the FlexRay bus 260, the prediction module 231 transmits the data frame Dr of the rewriting data 221 to the FlexRay bus 260. More specifically, the prediction module 231 transmits the data frame Dr of the rewriting data 221 to the update subject vehicle control apparatus 240a via the FlexRay bus 260 using the mini-slot Tdsn closest to the end position of the dynamic segment Tds, for example.

When, at this time, an unexpected event transmission data frame is generated such that the data frame Dr of the rewriting data 221 cannot be accommodated in the dynamic segment Tds of a single cycle, the data frame Dr is transmitted in a following cycle. Hence, when the data frame Dr of the rewriting data 221 is transmitted to the update subject vehicle control apparatus 240a via the FlexRay bus 260, vehicle data and the like originally exchanged via the FlexRay bus 260 are handled preferentially.

When the data frame Dr of the rewriting data 221 transmitted from the rewriting data transmission control device 230 is received by the update subject vehicle control apparatus 240a, reprogramming is executed on the vehicle control apparatus 240a using the received data frame Dr of the rewriting data 221. As a result, the control programs and control data incorporated into the vehicle control apparatus 240a in advance are rewritten in accordance with the rewriting program 110 distributed from the management center 100.

With the data rewriting support system and data rewriting support method for a vehicle control apparatus according to this embodiment, as described above, the aforesaid Effects (1) to (7) and (9) are obtained, and instead of Effect (8), a following effect is obtained.

(8A) A FlexRay is employed as the vehicle network, and therefore data frames transmitted from the rewriting data transmission control device 230 and the vehicle control apparatuses 240 can be transmitted to a transmission subject at a higher speed and more reliably.

Third Embodiment

A specific third embodiment of the data rewriting support system and the data rewriting support method for a vehicle control apparatus according to the aspect of the invention will be described below with reference to FIG. 9. The third embodiment shares a basic configuration with the first embodiment but differs therefrom in that the data frame of the rewriting data 221 is transmitted only on the basis of the prescribed priority level of the data frame.

Figure 9:
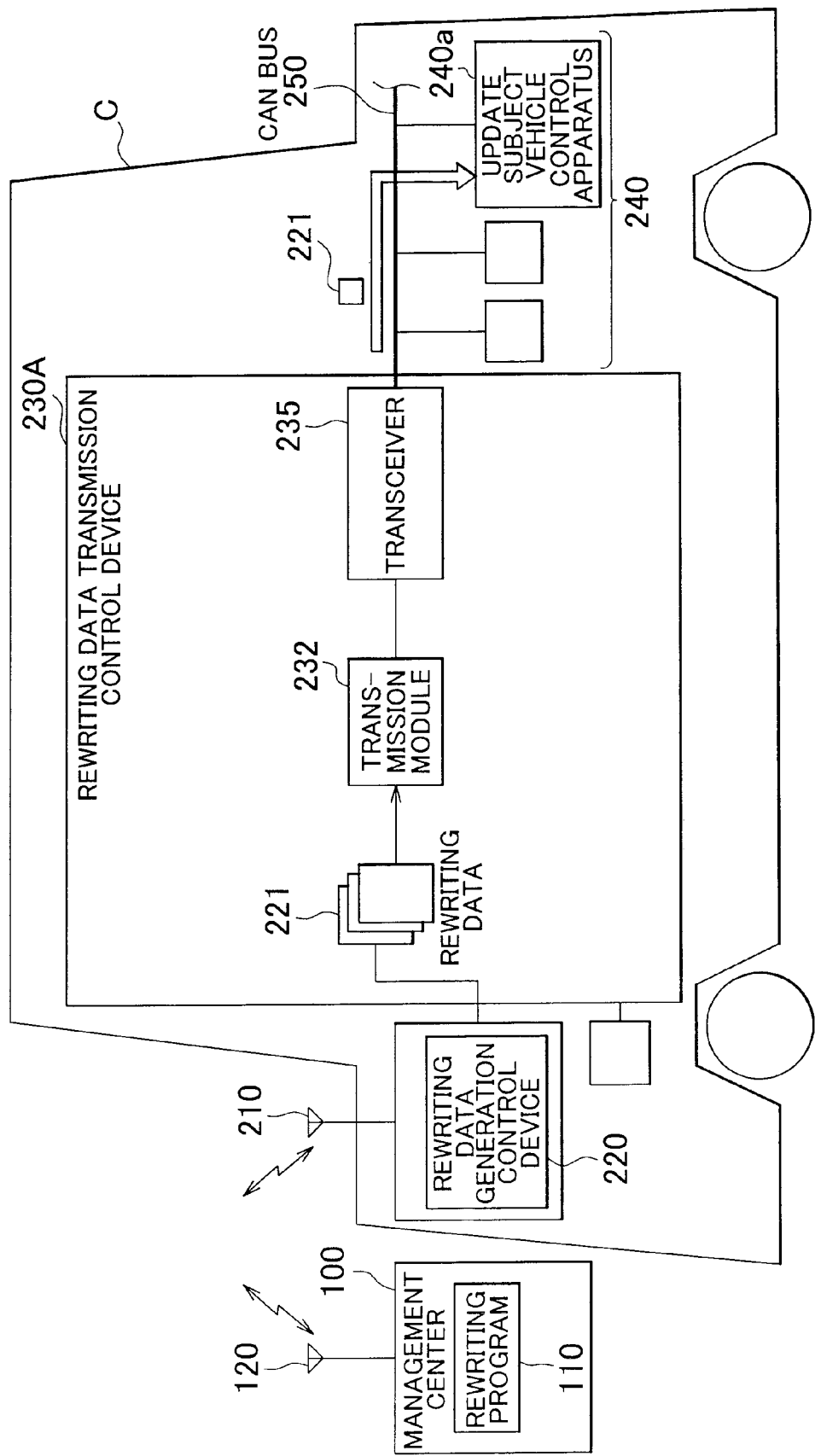
FIG. 9 is a block diagram showing a schematic configuration of a system according to a third embodiment.

FIG. 9 corresponds to FIG. 1, and shows an example of the configuration of a system to which the data rewriting support system and data rewriting support method for a vehicle control apparatus according to the third embodiment are applied. Note that in FIG. 9, identical elements to the respective elements shown in FIG. 1 have been allocated identical reference numerals, and duplicate description of these identical elements has been omitted.

More specifically, as shown in FIG. 9, a rewriting data transmission control device 230A according to this embodiment does not include the prediction module 231, the periodically transmitted frame list 233, and the event transmission frame list 234.

When the rewriting data transmission control device 230A according to this embodiment obtains the rewriting data 221 generated by the rewriting data generation control device 220, the rewriting data transmission control device 230A converts the obtained rewriting data 221 into a data frame format and sets the priority level of the rewriting data 221 at the lowest level of the data transmitted to the CAN bus 250. In a case where the transmission priority level decreases as the ID of the data frame becomes larger, as shown in FIG. 2, the ID "0x7FF" having the maximum value, from among identifiers "0x0" to "0x7FF" having an 11-bit length, for example, is allocated to the data frame of the rewriting data 221.

Hence, the rewriting data transmission control device 230A sets the priority level of the data frame of the rewriting data 221, and then transmits the data frame of the rewriting data 221 appropriately to the CAN bus 250. When data other than the data frame of the rewriting data 221, or in other words a data frame of the various vehicle data and so on, exists on the CAN bus 250 at this time, transmission of the data frame of the rewriting data 221 is postponed in accordance with the priority level thereof. As a result, collisions between the data frame of the rewriting data 221 and the data frames of the various vehicle data and so on are avoided. Accordingly, the data frames of the various vehicle data and so on originally exchanged via the CAN bus 250 can be transmitted accurately to the transmission subject. When a data frame other than the data frame of the rewriting data 221 does not exist, on the other hand, the data frame of the rewriting data 221 is transmitted to the update subject vehicle control apparatus 240a via the CAN bus 250.

With the data rewriting support system and data rewriting support method for a vehicle control apparatus according to this embodiment, as described above, the aforesaid Effects (8) and (9) are obtained, and instead of Effects (1) to (7), a following effect is obtained.

(1A) When the data frame of the rewriting data 221 is to be transmitted to the CAN bus 250, the lowest priority level is set in relation to the data frame of the rewriting data 221. Hence, when the data frame of the rewriting data 221 is transmitted to the vehicle control apparatus 240 via the CAN bus 250, vehicle data and so on can be exchanged more reliably. Further, data rewriting can be realized on the vehicle control apparatuses 240 connected to the CAN bus 250 smoothly and with a simpler configuration while ensuring that data such as the various vehicle data are exchanged between the vehicle control apparatuses 240.

Other Embodiments

In the second embodiment, the FlexRay is formed from the single channel type FexRay bus 260 constituted by a pair of UTP cables. However, the invention is not limited thereto, and instead, a FlexRay bus may be constituted by two pairs of twisted pair cables, for example, such that the data are exchanged by a dual channel system using two channels, namely a channel A and a channel B. In this case, fault tolerance can be strengthened such that the respective data frames exchanged between the rewriting data transmission control device 230 and the vehicle control apparatuses 240 and between the respective vehicle control apparatuses 240 can be transmitted to the transmission subject even more reliably.

In the first and second embodiments, the prediction module 231 monitors the CAN bus 250 or the FlexRay bus 260 and calculates the predicted schedule only when the rewriting data transmission control device 230 is holding the rewriting data 221 to be transmitted to the CAN bus 250 or the FlexRay bus 260. However, the invention is not limited thereto, and the prediction module 231 may monitor the CAN bus 250 or the FlexRay bus 260 and calculate the predicted schedule at all times.

In the first and second embodiments, when data not registered in either the periodically transmitted frame list 233 or the event transmission frame list 234 are detected, the data are considered to be invalid data, and the processing shifts to the error mode. However, the invention is not limited thereto, and the validity of the data traveling on the CAN bus 250 or the FlexRay bus 260 need not be verified. In this case, the error mode may be omitted.

In the first and second embodiments, when an event transmission data frame not included in the predicted schedule is transmitted to the CAN bus 250 or the FlexRay bus 260, transmission of the data frame of the rewriting data 221 is continued. However, the invention is not limited thereto, and when an event transmission data frame not included in the predicted schedule is a data frame that is transmitted continuously until the traveling condition of the vehicle C satisfies a predetermined condition, the predicted schedule may be recalculated, taking into consideration the event transmission data frame, until the predetermined condition is satisfied. The data frame of the rewriting data 221 may then be transmitted to the CAN bus 250 or the FlexRay bus 260 on the basis of the recalculated predicted schedule. Further, when a data frame not included in the predicted schedule is transmitted to the CAN bus 250 or the FlexRay bus 260, transmission of the data frame of the rewriting data 221 may be interrupted and the predicted schedule may be recalculated.

In the first and second embodiments, the priority level of the data frame of the rewriting data 221 is set at the lowest level. However, the invention is not limited thereto, and if collisions between the data frame of the rewriting data 221 and data frames other than the rewriting data 221 can be avoided by having the transmission module 232 monitor the CAN bus 250 or the FlexRay bus 260, either the priority level of the data frame of the rewriting data 221 need not be set at the lowest level or a priority level need not be set in relation to the data frame of the rewriting data 221.

In the second embodiment, the rewriting data transmission control device 230 includes the periodically transmitted frame list 233 and the event transmission frame list 234. In the second embodiment, however, the data frame of the rewriting data 221 is transmitted in the dynamic segment Tds, and it is therefore possible to set only the dynamic segment Tds as a monitoring subject. In this case, the periodically transmitted frame list 233 may be omitted, and the various vehicle data (data frames) transmitted in the dynamic segment Tds may be monitored by referring only to the event transmission frame list 234.

In the first and second embodiments, the rewriting data transmission control device 230 includes the periodically transmitted frame list 233 and the event transmission frame list 234. However, the invention is not limited thereto, and the periodically transmitted frame list 233 and event transmission frame list 234 may be omitted. In this case, the data length and transmission period of each type of data to be transmitted to the CAN bus 250 or the FlexRay bus 260 may be learned appropriately by having the prediction module 231 monitor the data transmission condition. The predicted schedule can then be calculated on the basis of the learning results and the data transmission condition of the CAN bus 250 or the FlexRay bus 260. Further, even when the data lengths and transmission cycles are not learned, the periodically transmitted frame list 233 and event transmission frame list 234 may be omitted as long as the data frame of the rewriting data 221 is transmitted to the CAN bus 250 or the FlexRay bus 260 in accordance with the data transmission condition of the CAN bus 250 or the FlexRay bus 260.

In the first and second embodiments, the correctness of the predicted schedule is verified on the basis of a comparison between the predicted schedule of the CAN bus 250 (the FlexRay bus 260) and the actual data transmission condition of the CAN bus 250 (the FlexRay bus 260). However, the invention is not limited thereto, and if reliability can be maintained in the predicted schedule, the correctness of the calculated predicted schedule need not be verified.

In the first and second embodiments, the predicted schedule is calculated by monitoring the data transmission condition of the CAN bus 250 or the FlexRay bus 260, and the data frame of the rewriting data 221 is transmitted in accordance with the predicted schedule. However, the invention is not limited thereto, and the data frame of the rewriting data 221 may be transmitted appropriately to the CAN bus 250 or the FlexRay bus 260 on the basis of the monitoring result relating to the data transmission condition without calculating the predicted schedule.

In the first and second embodiments, the rewriting data generation control device 220 is provided, and the rewriting program 110 downloaded from the management center 100 is converted into the rewriting data 221 by the rewriting data generation control device 220. However, the invention is not limited thereto, and in a case where rewriting data that can be used directly in the vehicle C are distributed to the vehicle C from the management center 100, the rewriting data generation control device 220 may be omitted.

A CAN or a FlexRay is employed as the vehicle network. However, the invention is not limited thereto, and any network, for example a Local Interconnect Network (LIN) capable of transmitting the rewriting data 221 downloaded from the management center 100 to the update subject vehicle control apparatus 240 may be employed as the vehicle network.

In the above embodiments, the rewriting program 110 is downloaded from the management center 100 through wireless communication. However, the invention is not limited thereto, and in another configuration, the rewriting program 110 is stored on a storage medium such as a USB memory, for example, and the rewriting program 110 stored on the storage medium is obtained by being downloaded through wired communication. In this case, the rewriting program 110 can be obtained with a higher degree of freedom.

The invention claimed is:
1. A data rewriting support system for a vehicle control apparatus, comprising:
   a communication device configured to download data relating to a control program or control data used to control the vehicle control apparatus from outside; and
   a processor configured to obtain rewriting data on the basis of the data downloaded by the communication device and transmit the rewriting data to the vehicle control apparatus connected communicably to a vehicle network, wherein the processor is configured to monitor a transmission condition of data transmitted to the vehicle network and transmit the rewriting data to the vehicle network in accordance with the monitored data transmission condition, the processor includes a prediction module that predicts a schedule of the vehicle network on the basis of the monitored data transmission condition, the processor is configured to determine a transmission timing of the rewriting data in accordance with the schedule predicted by the prediction module, the processor includes a periodically transmitted frame list on which an identifier, a data length, and a transmission period of data transmitted periodically to the vehicle network are registered, and an event transmission frame list on which an identifier and a data length of data transmitted to the vehicle network when an event occurs in the vehicle control apparatus are registered, the prediction module predicts the schedule of the vehicle network by referring to the periodically transmitted frame list and the event transmission frame list, the processor is configured to perform in one of re-prediction processing, transmission continuation processing, and error mode shift processing when unpredicted data not included in the predicted schedule is transmitted to the vehicle network, the re-prediction processing is processing performed to interrupt transmission of the rewriting data and re-predict the schedule of the vehicle network when the unpredicted data is data registered on the periodically transmitted frame list, the transmission continuation processing is processing performed to continue transmitting the rewriting data when the unpredicted data is data registered on the event transmission frame list, the error mode shift processing is processing performed to interrupt transmission of the rewriting data and shift to an error mode when the unpredicted data is data not registered on either the periodically transmitted frame list or the event transmission frame list, and the processor is configured to perform processing to interrupt transmission of the rewriting data and re-predict the schedule of the vehicle network when predicted data included in the predicted schedule are not transmitted to the vehicle network.

2. The data rewriting support system for a vehicle control apparatus according to claim 1, wherein:
transmission data to be transmitted to the vehicle network is transmitted to the vehicle network in accordance with a priority level prescribed for the transmission data; and
the processor is configured to set the priority level of the rewriting data at a lowest level.

3. The data rewriting support system for a vehicle control apparatus according to claim 1, wherein:
the vehicle network is a control area network that transmits the data using an event-triggered system; and
the processor is configured to transmit the rewriting data at a timing when data other than the rewriting data is not transmitted.

4. The data rewriting support system for a vehicle control apparatus according to claim 1, wherein:
the vehicle network is a FlexRay having a communication cycle that includes a static segment in which prescheduled static data is transmitted and a dynamic segment in which dynamic data is transmitted in response to occurrence of an event; and
the processor is configured to transmit the rewriting data in the dynamic segment.

5. The data rewriting support system for a vehicle control apparatus according to claim 1, wherein the communication device is configured to download the data relating to the control program or the control data used to control the vehicle control apparatus from a management center either through wireless communication or through wired communication via a storage medium.

6. A data rewriting support method for a vehicle control apparatus, comprising:
downloading data relating to a control program or control data used to control the vehicle control apparatus from outside;
obtaining rewriting data on the basis of the downloaded data;
monitoring a transmission condition of data transmitted to a vehicle network
transmitting the rewriting data to the vehicle network in accordance with the monitored data transmission condition so that the rewriting data are transmitted to the vehicle control apparatus that is connected communicably to the vehicle network;
predicting a schedule of the vehicle network on the basis of the monitored data transmission condition; and
determining a transmission timing of the rewriting data in accordance with the predicted schedule, wherein
the schedule of the vehicle network is predicted by referring to a periodically transmitted frame list on which an identifier, a data length, and a transmission period of data transmitted periodically to the vehicle network are registered, and an event transmission frame list on which an identifier and a data length of data transmitted to the vehicle network when an event occurs in the vehicle control apparatus are registered,
the method further comprises:
performing one of re-prediction processing, transmission continuation processing, and error mode shift processing when unpredicted data not included in the predicted schedule is transmitted to the vehicle network; and
performing processing to interrupt transmission of the rewriting data and re-predict the schedule of the vehicle network when predicted data included in the predicted schedule is not transmitted to the vehicle network, and
the re-prediction processing is processing performed to interrupt transmission of the rewriting data and re-predict the schedule of the vehicle network when the unpredicted data is data registered on the periodically transmitted frame list,
the transmission continuation processing is processing performed to continue transmitting the rewriting data when the unpredicted data is data registered on the event transmission frame list, and
the error mode shift processing is processing performed to interrupt transmission of the rewriting data and shift to an error mode when the unpredicted data is data not registered on either the periodically transmitted frame list or the event transmission frame list.

7. The data rewriting support method for a vehicle control apparatus according to claim 6, wherein:
the vehicle network is a control area network that transmits the data using an event-triggered system; and the rewriting data is transmitted at a timing when data other than the rewriting data is not transmitted.

8. The data rewriting support method for a vehicle control apparatus according to claim 6, wherein:
the vehicle network is a FlexRay having a communication cycle that includes a static segment in which prescheduled static data is transmitted and a dynamic segment in which dynamic data is transmitted in response to occurrence of an event; and
the rewriting data is transmitted in the dynamic segment.

9. The data rewriting support method for a vehicle control apparatus according to claim 6, wherein the data relating to the control program or the control data used to control the vehicle control apparatus is downloaded from a management center either through wireless communication or through wired communication via a storage medium.

* * * * *